United States Patent
Iivonen

(10) Patent No.: US 6,374,339 B2
(45) Date of Patent: Apr. 16, 2002

(54) METHOD FOR IMPLEMENTING A QUEUE IN A MEMORY, AND MEMORY ARRANGEMENT

(75) Inventor: Jukka-Pekka Iivonen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/798,371

(22) Filed: Mar. 2, 2001

Related U.S. Application Data

(63) Continuation of application No. PCT/FI99/00704, filed on Aug. 27, 1999.

(30) Foreign Application Priority Data

Sep. 8, 1998 (FI) .................................................. 981917

(51) Int. Cl.$^7$ ............................................. G06F 12/08
(52) U.S. Cl. ..................................... 711/170; 711/165
(58) Field of Search ................................. 711/165, 170

(56) References Cited

U.S. PATENT DOCUMENTS

| | | | |
|---|---|---|---|
| 4,320,455 A | 3/1982 | Woods et al. ................ | 710/200 |
| 5,432,908 A | 7/1995 | Heddes et al. ............... | 711/147 |
| 5,671,446 A | 9/1997 | Rakity et al. .................. | 710/54 |
| 5,848,416 A | * 12/1998 | Tikkanen .................... | 707/101 |
| 6,032,207 A | * 2/2000 | Wilson ......................... | 710/54 |
| 6,115,716 A | * 9/2000 | Tikkanen et al. ............ | 707/100 |
| 2001/0042186 A1 | * 11/2001 | Iivonen et al. ............... | 707/100 |

FOREIGN PATENT DOCUMENTS

| | | |
|---|---|---|
| EP | 0650131 A1 | 4/1995 |
| EP | 0717347 A2 | 6/1996 |
| GB | 2012084 A | 7/1979 |
| WO | WO 95/34155 | 12/1995 |

\* cited by examiner

*Primary Examiner*—Reba I. Elmore
(74) *Attorney, Agent, or Firm*—Altera Law Group, LLC

(57) ABSTRACT

The invention relates to a method for implementing a queue, particularly a FIFO queue, in a memory (MEM) and to a memory arrangement. In order to enable reducing the amount of copying particularly in a functional environment, at least part of the queue is formed with a tree-shaped data structure (A, B) known per se, having nodes at several different hierarchy levels, wherein an individual node can be (i) an internal node (N1–N3) containing at least one pointer pointing to a node lower in the tree-shaped hierarchy or (ii) a leaf node (N4–N6) containing at least one pointer to data unit (1 . . . 6) stored in the memory or at least one data unit. A given maximum number of pointers that an individual node can contain is defined for the nodes. The additions to be made to said part are directed in the tree-shaped data structure to the first non-full node (N4), seen from below, on a predetermined first edge of the data structure and they are further implemented in such a way that the leaf nodes remain at the same hierarchy level of the tree-shaped data structure, wherein when a non-full node is not present, new nodes are created to maintain the leaf nodes at the same hierarchy level. The deletions to be made from said part are typically directed to the leaf node on the opposite edge of the tree.

17 Claims, 6 Drawing Sheets

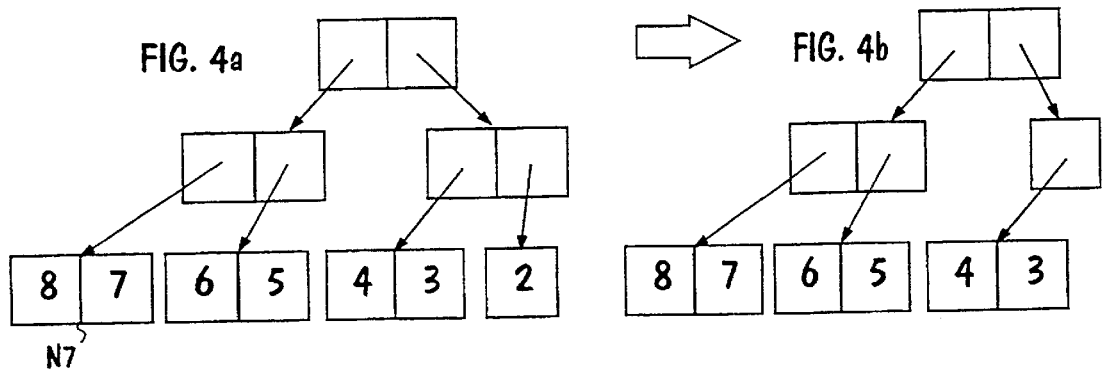
FIG. 4a
FIG. 4b
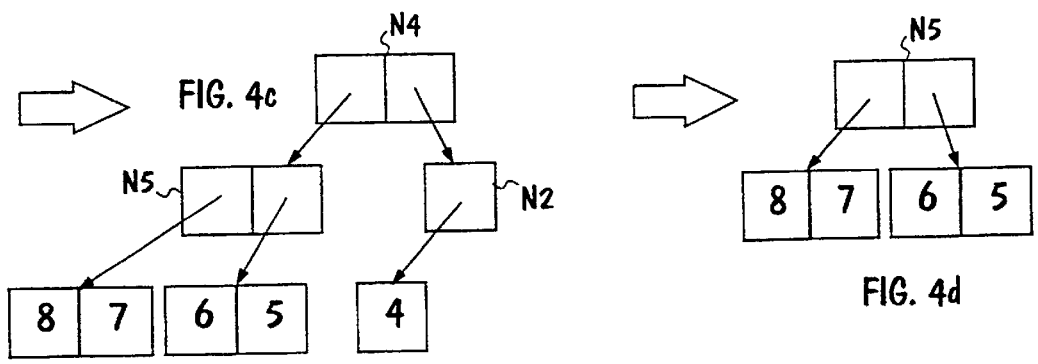
FIG. 4c
FIG. 4d
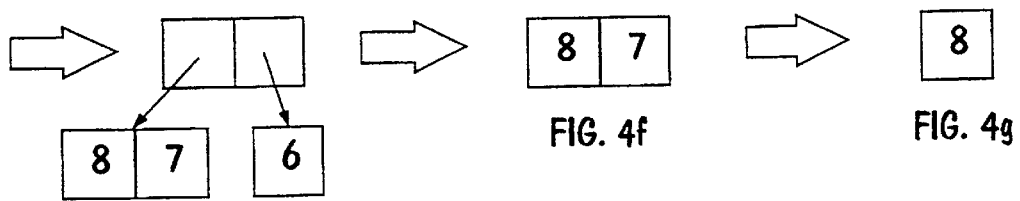
FIG. 4e
FIG. 4f
FIG. 4g

US 6,374,339 B2

METHOD FOR IMPLEMENTING A QUEUE IN A MEMORY, AND MEMORY ARRANGEMENT

This application is a continuation of PCT/FI99/00704 filed Aug. 27, 1999.

FIELD OF THE INVENTION

The present invention relates generally to the implementation of a memory. More specifically, the invention relates to the implementation of a queue, particularly a FIFO-type queue (First In First Out), in a memory. The solution in accordance with the invention is intended for use specifically in connection with functional memories. By a functional memory is understood a memory in which updates, such as additions, are carried out in such a way that first the path from the root of a tree-shaped structure to the point of updating is copied, and thereafter the update is made in the copied data (i.e., the update is not directly made to the existing data). Such an updating procedure is also termed "copy-on-write".

BACKGROUND OF THE INVENTION

In overwrite memory environments, in which updates are not made in the copy but directly in the original data (overwrite), a FIFO queue is normally implemented by means of a double-ended list of the kind shown in FIG. 1. The list comprises nodes of three successive elements in a queue, three of such successive nodes being shown in the figure (references N(i−1), Ni and N(i+1)). The element on the first edge of each node has a pointer to the preceding node in the queue, the element on the opposite edge again has a pointer to the next node in the queue, and the middle element in the node has either the actual stored data record or a pointer to a record (the figure shows a pointer).

However, such a typical way of implementing a FIFO queue is quite ineffective for example in connection with functional memories, since each update would result in copying of the entire queue. If, therefore, the queue has e.g. N nodes, all N nodes must be copied in connection with each update prior to performing the update.

SUMMARY OF THE INVENTION

It is an object of the present invention to accomplish an improvement to the above drawback by providing a novel way of establishing a queue, by means of which the memory can be implemented in such a way that the amount of required copying can be reduced in a functional structure as well. This objective is achieved with a method as defined in the independent claims.

The idea of the invention is to implement and maintain a queue by means of a tree-shaped structure in which the nodes have a given maximum size and in which (1) additions of data units (to the queue) are directed in the tree-shaped data structure to the first non-full node, seen from below, on the first edge of the data structure and (2) deletions of data units (from the queue) are also directed to a leaf node on the edge of the tree, typically on the opposite edge. Furthermore, the idea is to implement the additions in such a way that the leaf nodes remain at the same hierarchy level of the tree-shaped data structure, which means that when such a non-full node is not present, new nodes are created to keep the leaf nodes at the same hierarchy level. The tree-shaped data structure will also be termed shortly a tree in the following.

When the solution in accordance with the invention is used, each update to be made in the functional environment requires a time and space that are logarithmically dependent on the length of the queue, since only the path leading from the root to the point of updating must be copied from the structure. The length of this path increases logarithmically in relation to the length of the queue. (When a FIFO queue contains N nodes, log N nodes shall be copied, where the base number of the logarithm is dependent on the maximum size of the node.)

Furthermore, in the solution in accordance with the invention the node to be updated is easy to access, since the search proceeds by following the edge of the tree until a leaf node is found. This leaf node provides the point of updating.

In accordance with a preferred embodiment of the invention, the data structure also comprises a separate header node comprising three elements, each of which may be empty or contain a pointer, so that when one element contains a pointer it points to a separate node constituting the end of the queue, when a given second element contains a pointer it points to said tree-shaped structure that is maintained in the above-described manner, and when a given third element contains a pointer it points to a separate node constituting the beginning of the queue. In this structure, additions are made in such a way that the node constituting the end is always filled first, and only thereafter will an addition be made to the tree-shaped structure. Correspondingly, an entire leaf node at a time is always deleted from the tree-shaped structure, and said leaf node is made to be the node constituting the beginning of the queue, wherefrom deletions are made as long as said node has pointers or data units left. Thereafter, a deletion is again made from the tree. On account of such a solution, the tree need not be updated in connection with every addition or deletion. In this way, the updates are made faster than heretofore and require less memory space than previously.

Since the queue in accordance with the invention is symmetrical, it can be inverted in constant time and constant space irrespective of the length of the queue. In accordance with another preferred additional embodiment of the invention, the header node makes use of an identifier indicating in each case which of said separate nodes constitutes the beginning and which constitutes the end of the queue. The identifier thus indicates which way the queue is interpreted in each case. The queue can be inverted by changing the value of the identifier, and the tree structure will be interpreted as a mirror image.

BRIEF DESCRIPTION OF THE DRAWINGS

In the following the invention and its preferred embodiments will be described in closer detail with reference to examples in accordance with the accompanying drawings, in which.

DETAILED DESCRIPTION OF THE INVENTION

Figure 1:
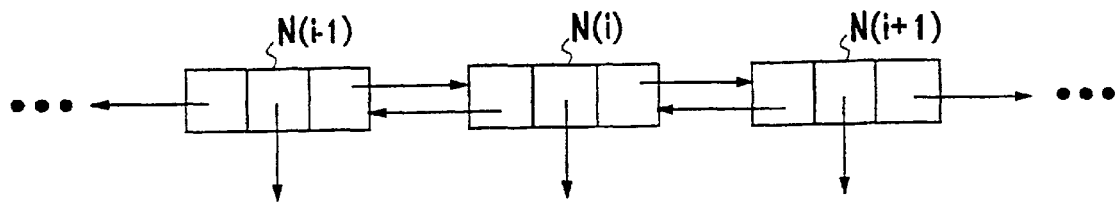
FIG. 1 illustrates a typical implementation of a FIFO queue.
Figure 2A:
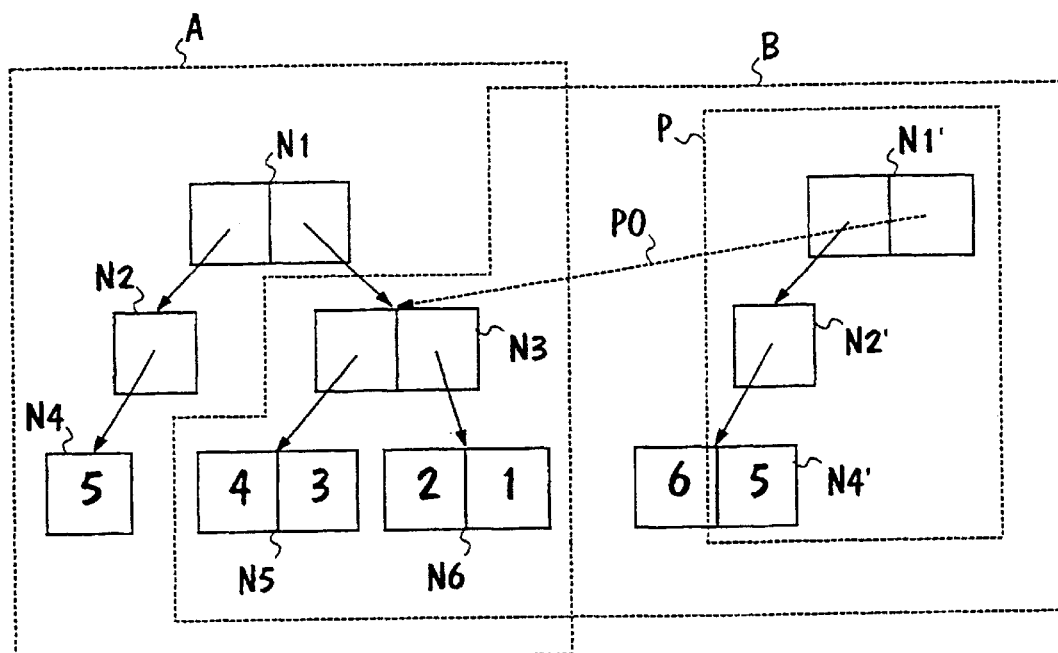
FIG. 2a shows a tree-shaped data structure used in the implementation of a FIFO queue and the principle of updates made in a functional memory.

FIG. 2a illustrates a tree-shaped data structure used to implement a FIFO queue in accordance with the invention and the principle of updating used in a functional memory environment. The figure illustrates a FIFO queue in an initial situation in which the queue comprises data records 1 . . . 5 and thereafter in a situation in which a further record 6 has been added to the queue.

Figure 2B:
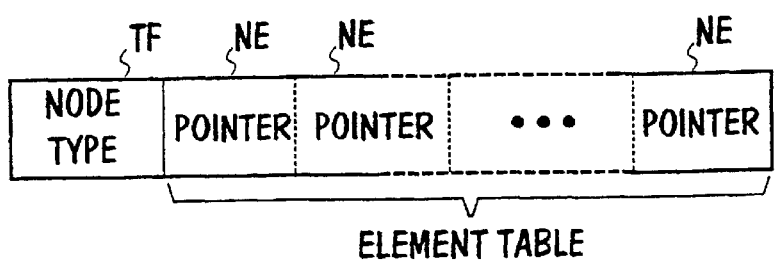
FIG. 2b illustrates the generic structure of a discrete node in the tree-shaped data structure used to implement the FIFO queue, FIGS. 3a ... 3h illustrate making of additions to a FIFO queue when the memory is implemented in accordance with the basic embodiment of the invention, FIGS. 4a ... 4g illustrate making of deletions from a FIFO queue when the memory is implemented in accordance with the basic embodiment of the invention, FIGS. 5a . . . 5h illustrate making of additions to a FIFO queue when the memory is implemented in accordance with a first preferred embodiment of the invention, FIGS. 6a . . . 6h illustrate making of deletions from a FIFO queue when the memory is implemented in accordance with the first preferred embodiment of the invention.

The data structure in accordance with the invention, by means of which the FIFO queue is established, comprises nodes and pointers contained therein. FIG. 2b illustrates the generic structure of a node. The node comprises a field TF indicating the node type and an element table having one or more elements NE. Each element in the node has a pointer pointing downward in the structure. In accordance with the invention, a given upper limit has been set for the number of elements (i.e., the size of the node). Hence, the nodes are data structures comprising pointers whose number in the node is smaller than or equal to said upper limit. In addition to the pointers and the type field, also other information may be stored in the node, as will be set forth hereinafter. At this stage, however, the other information is not essential to the invention.

The node at the highest level of the tree is called the root node, and all nodes at equal distance from the root node (measured by the number of pointers in between) are at the same (hierarchy) level. The nodes to which there are pointers from a given node are said to be child nodes of said node, and correspondingly said given node is said to be the parent node of these nodes. The tree-shaped data structure in accordance with the invention can have two kinds of nodes: internal nodes (N1, N2 and N3) and leaf nodes (N4, N5 and N6). Internal nodes are nodes wherefrom there are pointers either to another internal node or to a leaf node. Leaf nodes, on the other hand, are nodes at the lowest level of the tree, wherefrom only records are pointed to. Thus the leaf nodes do not contain pointers to other leaf nodes or internal nodes. Instead of pointers, the leaf nodes can also contain actual records, particularly when all records to be stored in the queue are of equal size. Whilst it was stated above that each element in a node has a pointer pointing downward in the structure, the leaf nodes make an exception to this if the records are stored in the leaf nodes.

In FIG. 2a, the rectangle denoted with broken line A illustrates a tree-shaped structure in an initial situation in which the structure comprises nodes N1 . . . N6, in which case records 1 . . . 5 in the FIFO queue are either in leaf nodes N4 . . . N6 or leaf nodes N4 . . . N6 contain pointers to records 1 . . . 5. When record 6 is added to this FIFO queue, an addition is made to node N4, wherein in the functional structure the path from the root node (N1) to the point of updating (node N4) is first copied. The copied path is denoted with reference P and the copied nodes with references N1', N2' and N4'. Thereafter record 6 is added to the copy (node N4') and pointers are set to point to the previous data. In this case, the pointer (PO) of the second element of node N1' is set to point to node N3. After the updating, the memory thus stores a data structure represented by a polygon denoted by reference B. The nodes that are not pointed to are collected by known garbage collection methods.

In the invention, a balanced tree structure is used to implement a queue. This tree meets the following two conditions:

1. all leaf nodes of the tree are at the same level.
2. All internal nodes of the tree are full, except for the nodes on the left or right edge of the tree, which are not necessarily full.

The first condition is called the balance condition and the second condition the fill condition. In addition, a maximum size is set for the nodes of the tree, the nodes may e.g. be permitted only five child nodes. In the following, the maintenance of the FIFO queue in accordance with the invention will be described in detail.

Figures 3A, 3B, 3C:
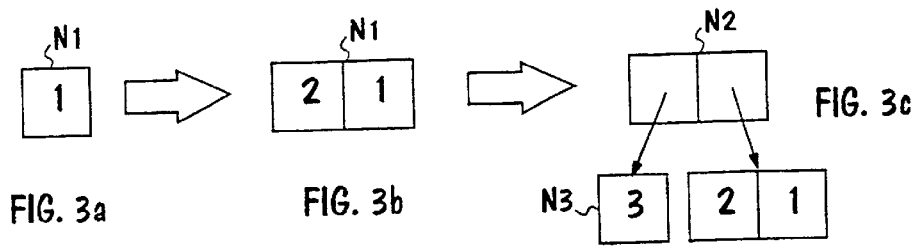

FIGS. 3a . . . 3h illustrate a procedure in which records 1 . . . 8 are added to an initially empty tree structure (i.e., a FIFO queue) one record at a time. In this example, as in all the following examples, the following presumptions and simplifications have been made (for straightforwardness and clarity):

a node may have a maximum of two pointers only, the records (i.e., their numbers) are drawn within the leaf nodes, even though each leaf node typically has a pointer to said record. It is presumed in the explication of the example that the leaf nodes have pointers to records, even though the leaf nodes may also contain records.

the copying to be carried out in the functional structure is not shown in order to more clearly highlight the principle of the invention. Thus, the same reference is used for the copy of a node and the corresponding original node.

Figures 3D, 3E:
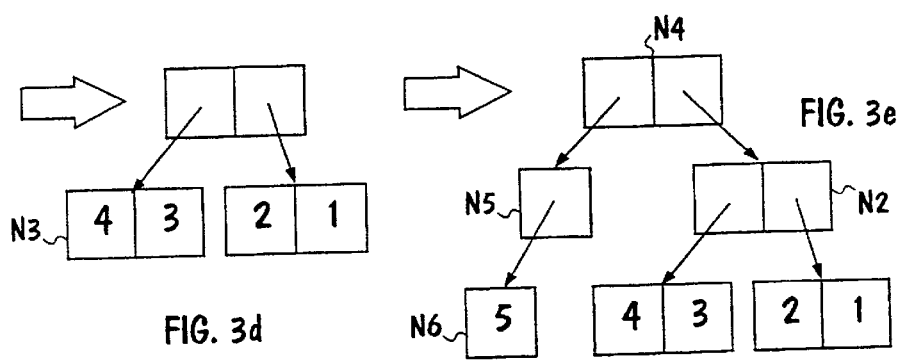

In the initial situation, the queue is empty, and when an addition is made to the queue, single-pointer internal node (N1) pointing to the added record is formed (FIG. 3a). When another record is added to the queue, the node is made into a two-pointer node containing pointers to both the first and the second record (FIG. 3b). When a third record is added, a new two-pointer internal node (N2) is created, the right-hand pointer of which points to the old internal node and the left-hand pointer of which points to a new leaf node (N3) having as a single child the new added record (FIG. 3c). When a fourth record is added, the addition is made (FIG. 3d) to the single-child node (N3) on the left-hand edge of the tree. In connection with the addition of a fifth record, a new two-pointer root node (N4) is again created, the right-hand element of which is set to point to the old root node and the left-hand element of which is set to point through two new single-pointer nodes (N5 and N6) to the added record (FIG. 3e). These new nodes are needed in order for the balance condition of the tree to be in force, that is, in order that all leaves of the tree may be at the same level.

Figures 3F, 3G:
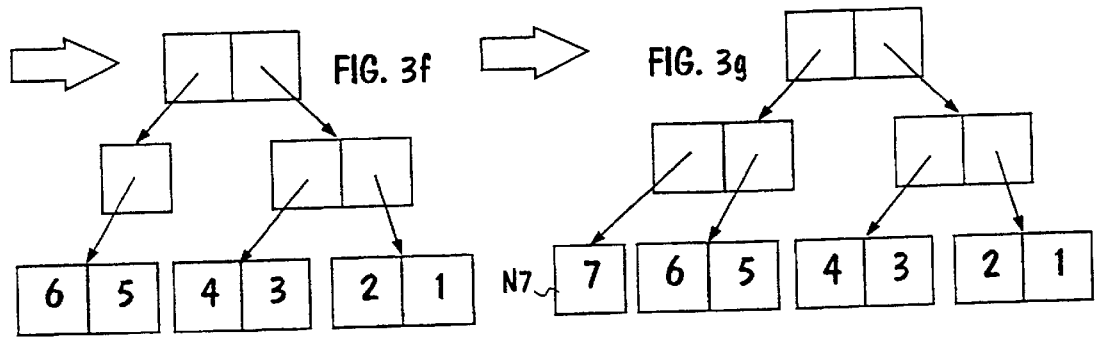

The addition of the next record (record six) is again made to the single-child leaf node N6 on the left-hand edge of the tree (FIG. 3f). Thereafter, in connection with the addition of the next record, the node (N5) on the left-hand edge of the tree next to the leaf node is filled, and the new pointer of said node is set to point to the added record (seven) through a new (single-child) leaf node N7. The last record (eight) is added by adding another pointer to this leaf node, pointing to the added record.

As stated previously, the copying carried out in the structure has not been illustrated at all for simplicity and clarity, but the figures only show the result of each adding step. In practice, however, copying is carried out in each adding step, and the update is made in the copy. Thus, for example record two is added in such a way that a copy is made of leaf node N1 and the record pointer is added to this copy. Correspondingly, for example in connection with the addition of record five, the content of the two-pointer node (N2) that is the root node is copied into the correct location before the addition and the update is made in the copy (nodes N4 . . . N6 with their pointers are added). FIG. 2a shows what kind of copying takes place for example in connection with the addition of record 6 (cf. FIGS. 3e and 3f). Since such a functional updating policy is known as such and does not relate to the actual inventive idea, it will not be described in detail in this context.

Figure 3H:
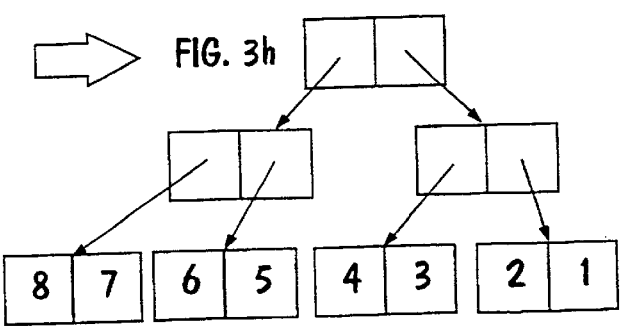

Deletion from the tree takes place in reverse order, that is, the right-most record is always deleted from the tree. FIGS. 4a . . . 4g illustrate a procedure in which all the records referred to above are deleted one at a time from the FIFO queue constituted by the tree structure of FIG. 3h which contains eight records. In the initial situation, the rightmost record (i.e., record one) of the tree is first searched therefrom, the relevant node is copied in such a way that only record two remains therein, and the path from the point of updating to the root is copied. The result is a tree as shown in FIG. 4a. Similarly, record two is deleted, which gives the situation shown in FIG. 4b, and record three, which gives the situation shown in FIG. 4c. If during deletion an internal node becomes empty, the deletion also proceeds to the parent node of said node. If it is found in that connection that the root node contains only one pointer, the root node is deleted and the new root will become the node which this single pointer points to. When record four is deleted, it is found that internal node N2 becomes empty, as a result of which the deletion proceeds to the root node (N4). Since the root node contains only one pointer after this, the root node is deleted and node N5 will be the new root. This gives the situation of FIG. 4d. Thereafter the deletions shown in the figures proceed in the manner described above, i.e. the rightmost record is always deleted from the tree and the root node is deleted when it contains only one pointer.

The copying to be carried out has not been described in connection with deletion either. The copying is carried out in the known manner in such a way that from the leaf node wherefrom the deletion is made, only the remaining part is copied, and in addition the path from the root to the point of updating. The pointers of the copied nodes are set to point to the nodes that were not copied.

As will be seen from the above explication, in a FIFO queue in accordance with the invention
- all leaf nodes in the tree are always at the same level (the lowest level if the records are not taken into account),
- all nodes in the tree are full, except for the nodes on the edges of the tree, and
- nodes are filled upwards. This means that in the first place, a non-full leaf node on the edge of the tree is filled. If such a leaf node is not found, the next step is to attempt to fill a non-full internal node on the edge next to a leaf node.

The additions and deletions can also be expressed in such a way that when an addition is made to the tree, the new record is made to be a leaf in the tree, which is obtained first in a preorder, and when a deletion is made from the tree the deletion is directed to the record that is obtained first in a postorder.

The above-stated structure can also be implemented as a mirror image, in which case the node added last is obtained first in a postorder and the one to be deleted next is obtained first in a preorder. This means that the additions are made on the right-hand edge and deletions on the left-hand edge of the tree (i.e., contrary to the above).

The above is an explanation of the basic embodiment of the invention, in which a FIFO queue is implemented merely by means of a tree-shaped data structure. In accordance with a first preferred embodiment of the invention, a three-element node, which in this context is called a header node, is added to the above-described data structure. One child of this header node forms the leaf node at the end (or pointing to the end) of the FIFO queue, the second child contains a tree of the kind described above, forming the middle part of the FIFO queue, and the third child forms the leaf node at the beginning (or pointing to the beginning) of the queue (provided that such a child exists). The separate nodes of the beginning and the end are called leaf nodes in this connection, since a filled node of the end is added as a leaf node to the tree and a leaf node that is deleted from the tree is made to be the node of the beginning.

Figure 5A:
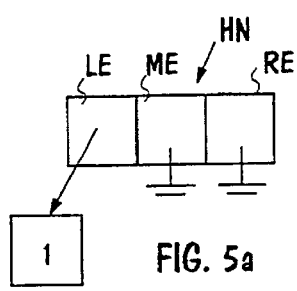

FIGS. 5a . . . 5h illustrate a procedure in which records 1 . . . 8 are added to an initially empty queue one record at a time. The header node is denoted with reference HN, the leftmost element in the header node, which in this case points to a (leaf node at the end of the queue, is denoted with the reference LE, and the rightmost element in the header node., which in this case points to a (leaf) node at the beginning of the queue, is denoted with reference RE.

Figure 5B:
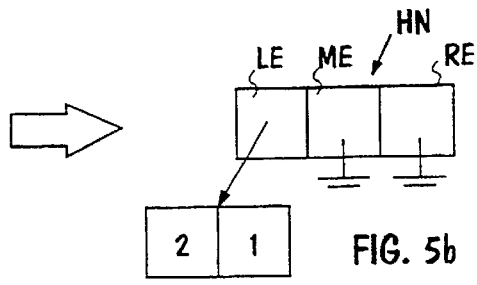
Figure 5C:
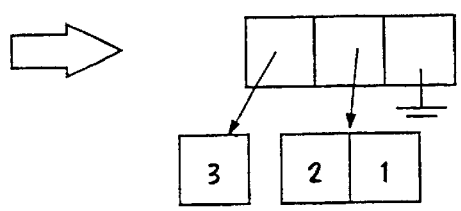
Figure 5D:
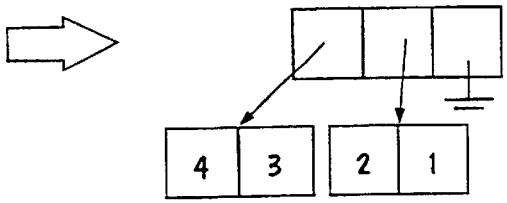
Figure 5E:
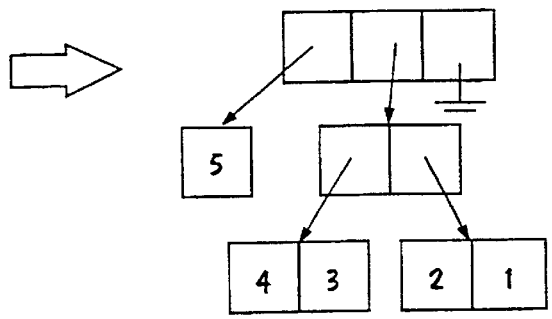
Figure 5F:
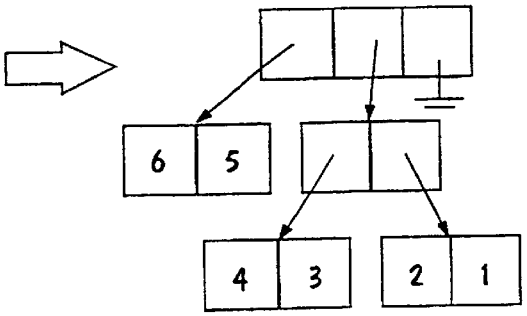
Figure 5G:
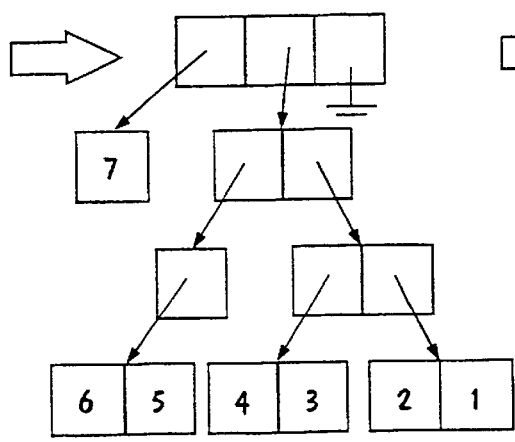

When a record is added to the end of the queue, a copy is made of the leaf node of the end and the record pointer is added to the copy (FIGS. 5a and 5b). If, however, the leaf node of the end is already full (FIGS. 5d and 5f), said leaf node is transferred to the tree in the header node (pointed to from the middlemost element in the header node). Thereafter a new leaf node for the end is created, in which said record is stored (FIGS. 5e and 5g). The addition of the leaf node to the tree is made in the above-described manner. The addition thus otherwise follows the above principles, but an entire leaf node is added to the tree, not only one record at a time. Hence, all leaf nodes in the tree are at the same level. The node pointed to from the leftmost element of the header node is thus always filled, whereafter the entire leaf node is added to the tree.

When a deletion is made from the beginning of the queue, it is first studied whether the beginning of the queue is empty (that is, whether the right-most element in the header node has a pointer). If the beginning is not empty, the rightmost record is deleted from the leaf node of the beginning. If, on the other hand, the beginning is empty, the rightmost leaf node is searched from the tree representing the middle part of the queue. This leaf node is deleted from the tree in the manner described above, except that an entire leaf node is deleted from the tree at a time, not only one record at a time as in the basic embodiment described above. This deleted leaf node is made to be the leaf node of the beginning of the queue, and thus the beginning is no longer empty. If also the tree is empty, the leaf node of the end is made to be the leaf node of the beginning. If also the end is empty, the entire queue is empty. Deletion from the beginning of the queue is made by copying the leaf node of the beginning in such a way that its last record is deleted in connection with the copying.

Figure 5H:
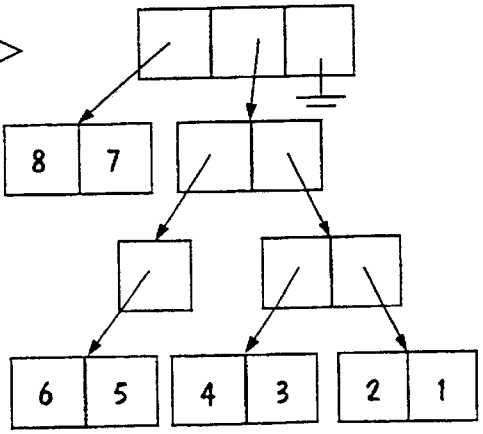
Figures 6A, 6B:
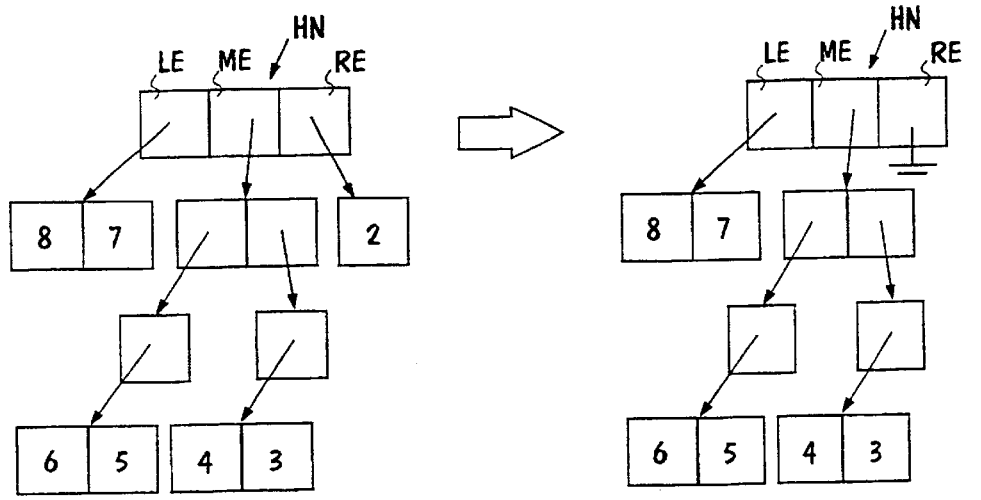
Figures 6C, 6D:
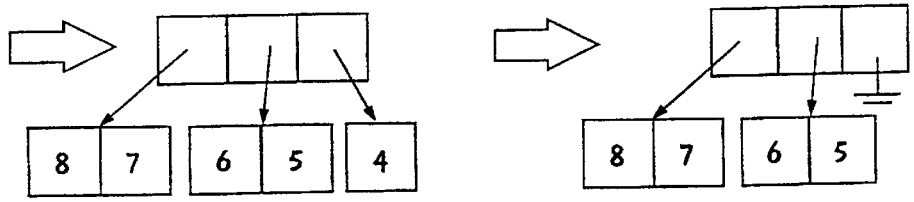
Figures 6E, 6F:
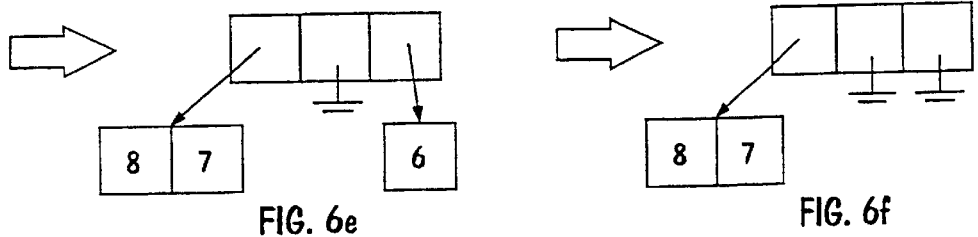
Figures 6G, 6H:
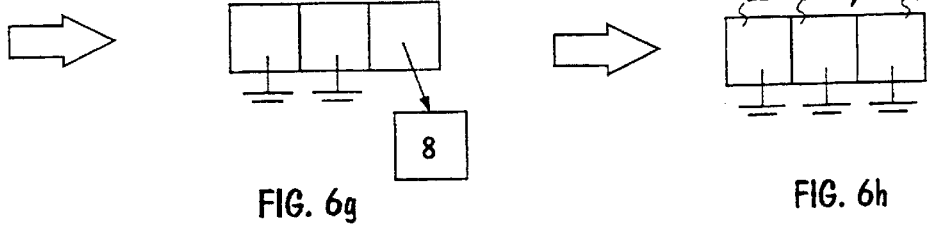

FIGS. 6a . . . 6h illustrate a procedure in which the records 1 . . . 8 added above are deleted from the queue one record at a time. The initial situation is shown in FIG. 5h. In the initial situation, the beginning of the queue is empty, and thus the rightmost leaf node is searched from the tree, said node being deleted from the tree and the deleted leaf node being made into the leaf node of the beginning of the queue. This gives the situation of FIG. 6a. The next deletion is made from the leaf node of the beginning, as a result of which the beginning becomes empty. Thereafter the rightmost record in the tree (record three) is again deleted. Since in that case only a single pointer remains in the root node of the tree, said root node is deleted. Also the new root node has only one pointer, wherefore it is deleted too. This gives the situation of FIG. 6c, in which the next record to be deleted is record four. When this record is deleted, the beginning of the queue is again empty (FIG. 6d), and thus in connection with the next deletion the leaf node pointing to record six is moved to the beginning of the queue, which makes the tree empty (FIG. 6e). When record six has been deleted, also the beginning is empty (FIG. 6f), and thus in connection with the next deletion the leaf node of the end is made to be the leaf node of the beginning (FIG. 6g). When also the end is empty (in addition to the fact that the beginning and the tree are empty), the entire queue is empty.

For the header node, the updating policy of the functional structure means that in connection with each addition, the header node and the leaf node of the end of the queue are copied. From this copy, a new pointer is set to the tree and to the old beginning (which thus need not be copied). Correspondingly, in connection with deletions the header node and the remaining portion of the leaf node of the beginning of the queue are copied and a new pointer is set from the copy to the tree and the old end.

By adding a header node to the memory structure, the updates will be made faster and less space-consuming than heretofore, since for the header node the additions require a (constant) time independent of the length of the queue. For example, if the maximum size of the node is five, only a fifth of the additions is made to the tree, and thus four fifths of the additions require a constant time and a fifth a time logarithmically dependent on the length of the queue.

Figure 7:
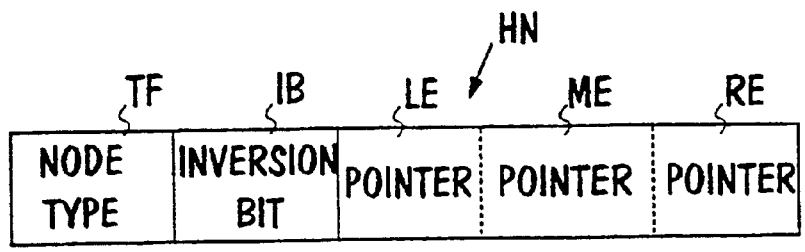
FIG. 7 illustrates a preferred embodiment for a header node used in the structure.

In accordance with another preferred embodiment of the invention, a bit is added to the header node, indicating which edge of the header node constitutes the end and which the beginning of the FIFO queue. In other words, the value of the bit indicates whether the queue is inverted or not. If the bit has for example the value one, the leaf node pointed to from the leftmost element LE of the header node is construed as the end of the queue and the leaf node pointed to from the rightmost element RE as the beginning of the queue, respectively. If the value of the bit changes to be reverse, the beginning and end are construed in the reverse order and, furthermore, the tree representing the middle part of the queue is construed as a mirror image in relation to the previous interpretation. FIG. 7 illustrates the generic (logical) structure of the header node. In addition to the inversion bit IB, the node comprises the above-stated type field TF, indicating that a header node is concerned. In addition, the node has the above-stated three elements, each of which may be empty or contain a pointer. The order of these elements can also vary in such a way that the beginning, middle, or end of the queue can be pointed to from any element. Thus, the middle part is not necessarily pointed to from the element in the middle and the beginning or end from an element on the edge.

Since copying the header node and making an update in the copy and updating the above-stated bit to an inverse value of the original value is sufficient for inversion of the queue, the queue can be inverted in constant time and space. Since the structure is also fully symmetrical, the queue can be used as a double-ended queue, that is, additions can also be made to the beginning and deletions can be made from the end of the queue (FIFO or LIFO principle). For a double-ended queue, the shorter term deque is also used.

The bit indicating the direction of the queue can also be used in the basic embodiment of the invention in which there is no header node. In such a case, the bit can be added to the individual nodes, and thus the bit indicates which edge of the tree is the beginning of the queue and which the end in that part of the tree which is beneath said node.

Figure 8:
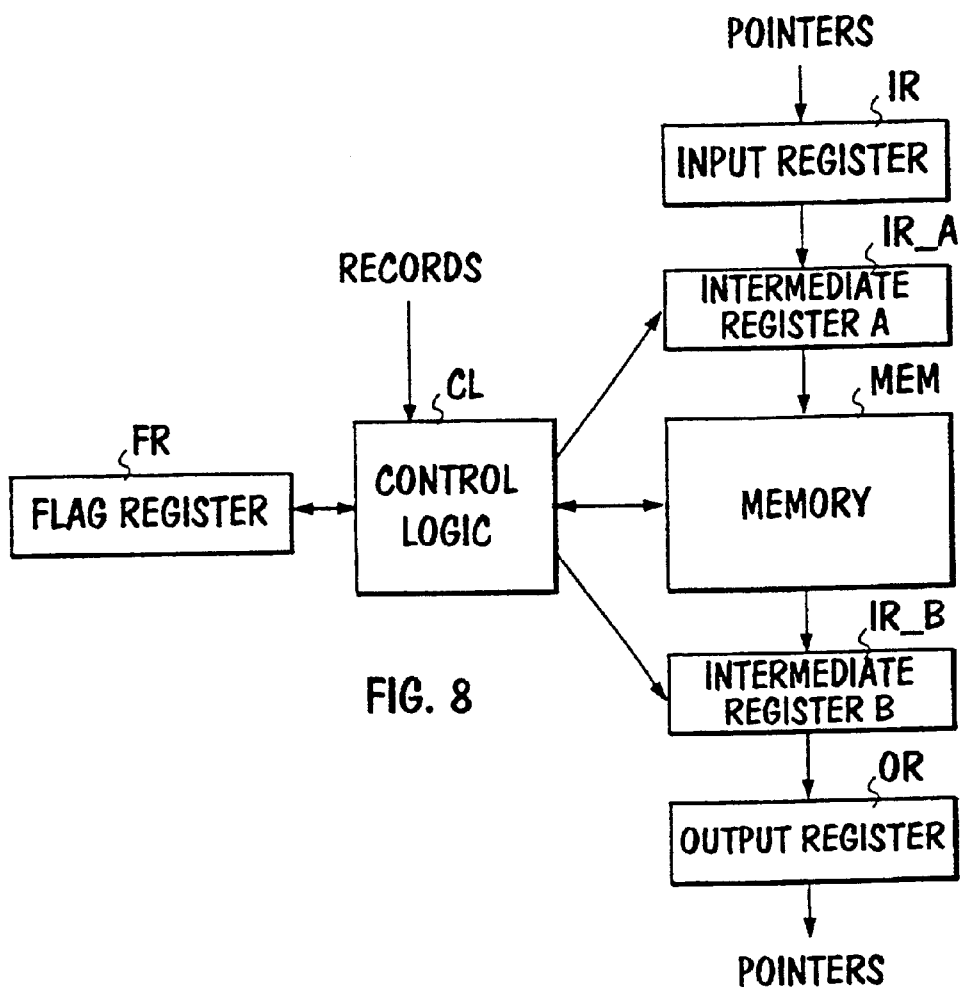
FIG. 8 shows a block diagram of a memory arrangement in accordance with the invention.

FIG. 8 illustrates a block diagram of a memory arrangement in accordance with the invention, implementing a memory provided with a header node. The memory arrangement comprises an actual memory MEM, in which the above-described tree structure with its records is stored, a first intermediate register IR_A in which the leaf node of the end (or beginning) of the queue is stored, a second intermediate register IR_B in which the leaf node of the beginning (or end) of the queue is stored, and control logic CL maintaining the queue (making additions of records to the queue and deletions of records from the queue).

For the control logic, the memory arrangement further comprises a flag register FR in which the value of the inversion bit is maintained. Furthermore, the memory arrangement comprises an input register IR through which the input of the record pointers takes place and an output register OR through which the record pointers are read out.

As normally in systems of this kind, the records are stored in advance in the memory (MEM), and in this record set a queue is maintained by means of pointers pointing to the records.

When a record pointer is supplied to the input register, the control logic adds it to the leaf node in the first intermediate register IR_A. If the first intermediate register is full, however, the control logic first stores the content of the register in the tree stored in the memory MEM. This takes place in such a way that the control logic follows the edge of the tree and copies the path from the root to the point of updating and makes the update in the copy. Thereafter the control logic adds a pointer to the intermediate register IR_A.

When records are deleted from the queue, the control logic reads the content of the second intermediate register IR_B and deletes the record closest to the edge therefrom, if the intermediate register is not empty. If the intermediate register is empty, the control logic retrieves from memory, following the edge of the tree, a leaf node and transfers its remaining part to the second intermediate register. At the same time, the control logic updates the tree in the manner described above.

Even though the invention has been explained in the above with reference to examples in accordance with the accompanying drawings, it is obvious that the invention is not to be so restricted, but it can be modified within the scope of the inventive idea disclosed in the appended claims. For example, the maximum size of the nodes is not necessarily fixed, but it can e.g. follow a pattern, for example so that at each level of the tree the nodes have their level-specific maximum size. Since the actual records can be stored separately and the tree only serves for forming a queue therefrom and maintaining the queue, the records can be located in a memory area or memory block separate from the tree.

What is claimed is:

1. A method for implementing a queue in a memory (MEM) in which data is stored as data units for each of which a dedicated storage space is assigned in the memory, in accordance with which method data units are added to and deleted from the queue, characterized in that at least part of the queue is implemented as a tree-shaped data structure (A, B) known per se, having nodes at several different hierarchy levels, wherein an individual node can be (i) an internal node containing at least one pointer pointing to a node lower in the tree-shaped hierarchy or (ii) a leaf node containing at least one pointer to a data unit stored in the memory, wherein the node at the highest level of the structure is the root node of the structure, and wherein in connection with the addition of a data unit a pointer pointing to said data unit is added to a leaf node and in connection with a deletion the pointer pointing to the data unit is deleted from a leaf node, a given maximum number of pointers that an individual node can contain is defined for the nodes, an individual node being full when it has said maximum number of pointers and non-full in other cases, the additions to be made to said part are directed in the tree-shaped data structure to the first non-full node, seen from below, on a predetermined first edge of the data structure and they are further implemented in such a way that the leaf nodes remain at the same hierarchy level of the tree-shaped data structure, wherein when a non-full node is not present, new nodes are created to keep the leaf nodes at the same hierarchy level, and the deletions to be made from said part are directed to the leaf node on the predetermined other edge of the tree.

2. A method as claimed in claim 1, characterized in that the deletions are directed to the leaf node that is on the opposite edge of the tree in relation to the node to which the additions are directed.

3. A method as claimed in claim 1, characterized in that if upon deletion an internal node is emptied of pointers, the deletion proceeds in the data structure upwards from said node in accordance with the pointers, and if it is found that the root node of the structure contains only one pointer, the root node is deleted and the node to which said pointer points is made the new root node of the data structure.

4. A method as claimed in claim 1, characterized in that in addition to the tree-shaped structure, the memory employs a separate header node (HN) comprising three elements each of which may be empty or contain a pointer, so that when one element contains a pointer it points to a separate node constituting the end of the queue, when a given second element contains a pointer it points to said tree-shaped data structure, and when a given third element contains a pointer it points to a separate node constituting the beginning of the queue.

5. A method as claimed in claim 4, characterized in that the header node employs an identifier (IB) indicating in each case which of said separate nodes constitutes the beginning and which the end of the queue.

6. A method as claimed in claim 4, characterized in that the additions are carried out in such a way that the node constituting the end of the queue is first filled with pointers, whereafter the node is added as a leaf node to said tree-shaped structure.

7. A method as claimed in claim 4, characterized in that the deletions are carried out in such a way that when said third element contains a pointer the deletion is made from the node pointed to by said pointer and when said third element is empty the deletion is made from said tree-shaped structure by deleting an entire leaf node therefrom and making the part remaining in said leaf node after the deletion the node constituting the beginning of the queue.

8. A method for implementing a queue in a memory (MEM) in which data is stored as data units for each of which a dedicated memory space is assigned in the memory, in accordance with which method data units are added to and deleted from the memory, characterized in that at least part of the queue is implemented as a tree-shaped data structure known per se, having nodes at several different hierarchy levels, wherein an individual node can be (i) an internal node containing at least one pointer pointing to a node lower in the tree-shaped hierarchy or (ii) a leaf node containing at least one data unit, wherein the node at the highest level of the structure is the root node of the structure and wherein the data unit is added to and deleted from a leaf node, a given maximum number of pointers for the internal nodes and a given maximum number of data units for the leaf nodes that an individual node can contain is defined, an individual node being full when it has said maximum number of pointers or data units and non-full in other cases, the additions to be made to said part are directed in the tree-shaped data structure to the first non-full node, seen from below, on a predetermined first edge of the data structure and they are further implemented in such a way that the leaf nodes remain at the same hierarchy level of the tree-shaped data structure, wherein when a non-full node is not present, new nodes are created to keep the leaf nodes at the same hierarchy level, and the deletions to be made from said part are directed to the leaf node on the predetermined other edge of the tree.

9. A method as claimed in claim 8, characterized in that the deletions are directed to the leaf node that is on the opposite edge of the tree in relation to the node to which the additions are directed.

10. A method as claimed in claim 8, characterized in that if upon deletion an internal node is emptied of pointers, the deletion proceeds in the data structure upwards from said node in accordance with the pointers, and if it is found that the root node of the structure contains only one pointer, the root node is deleted and the node to which said pointer points is made the new root node of the data structure.

11. A method as claimed in claim 8, characterized in that in addition to the tree-shaped structure, the memory employs a separate header node (HN) comprising three elements each of which may be empty or contain a pointer, so that when one element contains a pointer it points to a separate node constituting the end of the queue, when a given second element contains a pointer it points to said tree-shaped data structure, and when a given third element contains a pointer it points to a separate node constituting the beginning of the queue.

12. A method as claimed in claim 11, characterized in that the header node employs an identifier (IB) indicating in each case which of said separate nodes constitutes the beginning and which the end of the queue.

13. A method as claimed in claim 11, characterized in that the additions are carried out in such a way that the node constituting the end of the queue is first filled with data units, whereafter the node is added as a leaf node to said tree-shaped structure.

14. A method as claimed in claim 11, characterized in that the deletions are carried out in such a way that when said third element contains a pointer the deletion is made from the node pointed to by said pointer and when said third element is empty the deletion is made from said tree-shaped structure by deleting an entire leaf node therefrom and making the part remaining in said leaf node after the deletion the node constituting the beginning of the queue.

15. A memory arrangement for implementing a queue, said queue comprising memory units stored in the memory and said arrangement including a tree-shaped data structure stored in the memory, having nodes at several different hierarchy levels, wherein an individual node can be (i) an internal node containing at least one pointer pointing to a node lower in the tree-shaped hierarchy or (ii) a leaf node containing at least one pointer to a data unit stored in the memory or at least one data unit, the node at the highest level of the structure being the root node of the structure, characterized in that each node contains at most a given predetermined maximum number of pointers or data units, a node being full when it has said maximum number of pointers or data units, and that all nodes of the tree-shaped data structure are full except for the nodes on the edges of the structure, and that all leaf nodes of the tree-shaped data structure are continually at the same hierarchy level, wherein the pointers or data units contained in the leaf nodes form at least part of the queue.

16. A memory arrangement as claimed in claim 15, characterized in that it further comprises a separate header node (HN) comprising three elements each of which may be empty or contain a pointer, so that when one element contains a pointer it points to a separate node constituting the end of the queue, when a given second element contains a pointer it points to said tree-shaped data structure, and when a given third element contains a pointer it points to a separate node constituting the beginning of the queue, wherein the tree-shaped data structure forms at least the middle part of the queue.

17. A memory arrangement as claimed in claim 16, characterized in that the header node further comprises an identifier (IB) indicating the nodes constituting the beginning and the end of the queue in each case.

\* \* \* \* \*